United States Patent [19]

Lintott

[11] 4,207,775

[45] Jun. 17, 1980

[54] FUEL PUMPING APPARATUS

[75] Inventor: Edward R. Lintott, London, England

[73] Assignee: Lucas Industries Limited, Birmingham, England

[21] Appl. No.: 910,069

[22] Filed: May 26, 1978

[30] Foreign Application Priority Data

Jun. 17, 1977 [GB] United Kingdom ............... 25426/77

[51] Int. Cl.$^2$ .......................... F16H 53/06; F01L 1/14

[52] U.S. Cl. ........................................ 74/55; 123/90.5; 417/539; 74/569

[58] Field of Search ............................. 74/569, 54, 55; 123/90.5; 92/165 PR; 417/539

[56] References Cited

U.S. PATENT DOCUMENTS

| | | | |
|---|---|---|---|
| 3,668,945 | 6/1972 | Hofmann | 123/90.5 X |
| 3,998,190 | 12/1976 | Keske | 74/569 X |
| 4,089,234 | 5/1978 | Henson et al. | 74/569 |

*Primary Examiner*—Peter P. Nerbun

[57] ABSTRACT

A fuel pumping apparatus includes a housing in which is located a plurality of reciprocable tappet assemblies including tappet bodies. The tappets carry rollers for engagement with cams respectively. In order to prevent rotation of the tappet bodies adjacent pairs of the tappet bodies are provided with mutually facing and mutually inclined flats which are engaged by wedge-shaped guide members. The flats and guide members permit reciprocable movement of the tappet bodies but prevent rotation thereof.

4 Claims, 2 Drawing Figures

FUEL PUMPING APPARATUS

This invention relates to fuel pumping apparatus, principally for a compression ignition engine.

According to the present invention, there is provided fuel pumping apparatus comprising a housing including a plurality of cylinders; a piston reciprocable within each cylinder; a tappet assembly operatively connected to each piston and including a tappet body and a tappet roller rotatably carried thereby, each tappet body having a guide surface thereon, the guide surfaces on each adjacent pair of tappet bodies being mutually facing; a plurality of rotatable cams each engaged by a respective one of the tappet rollers, such that rotation of each cam in use causes reciprocation of the respective tappet assembly and the respective piston; the housing also including a block having a plurality of bores therethrough, each bore slidably housing a respective one of the tappet assemblies; and the apparatus further comprising a guide assembly mounted on a side of said block remote from the rotatable cams, the guide assembly including guide members each of which extends between a respective adjacent pair of tappet bodies and engages the guide surfaces thereon so as to prevent rotation of the tappet assemblies relative to the block.

Preferably, the guide surfaces on each pair of adjacent tappet bodies are mutually inclined, and each guide member is wedge-shaped.

Conveniently, each tappet body is of generally circular cylindrical external shape, and the guide surface thereon is in the form of a flat.

Desirably, said guide assembly is in the form of a plate of which the guide members form an integral part.

Also according to the present invention, there is provided fuel pumping apparatus comprising a housing including a plurality of cylinders, a piston reciprocable within each cylinder; a tappet assembly operatively connected to each piston and including a tappet body and a tappet roller rotatably carried thereby, each tappet body having a guide surface thereon, the guide surfaces on each adjacent pair of tappet bodies being mutually facing and mutually inclined; a plurality of rotatable cams each engaged by a respective one of the tappet rollers, such that rotation of each cam in use causes reciprocation of the respective tappet assembly and the respective piston; and a guide assembly mounted on the housing and including a plurality of wedge-shaped guide members, each guide member extending between a respective adjacent pair of tappet bodies and engaging the guide surfaces thereon so as to prevent rotation of the tappet assemblies relative to the housing.

Figure 1:
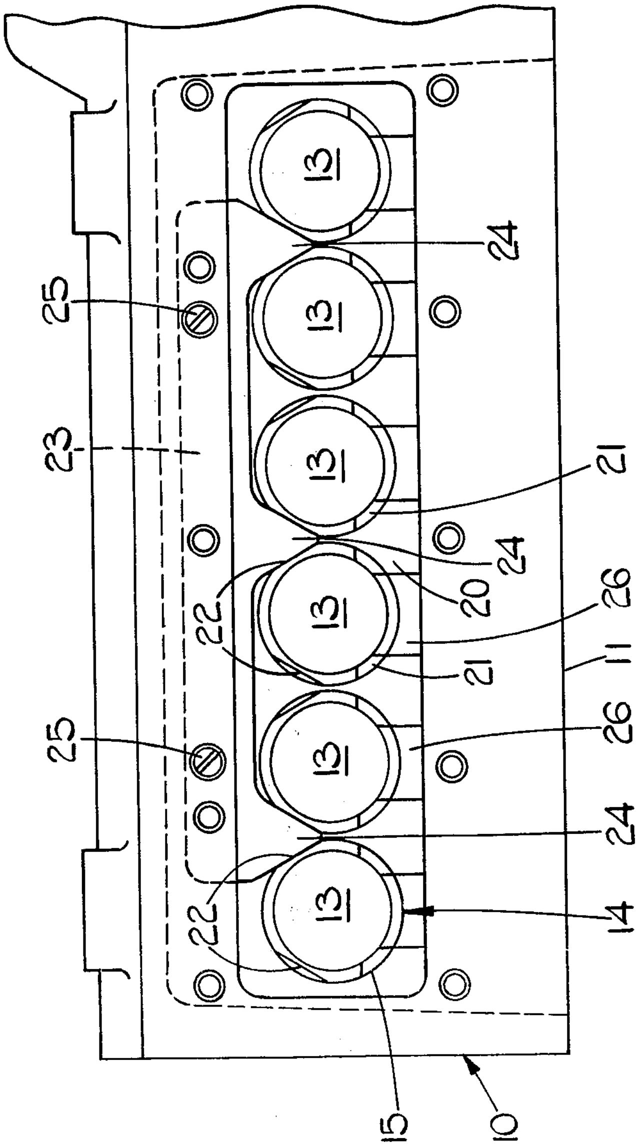
Figure 2:
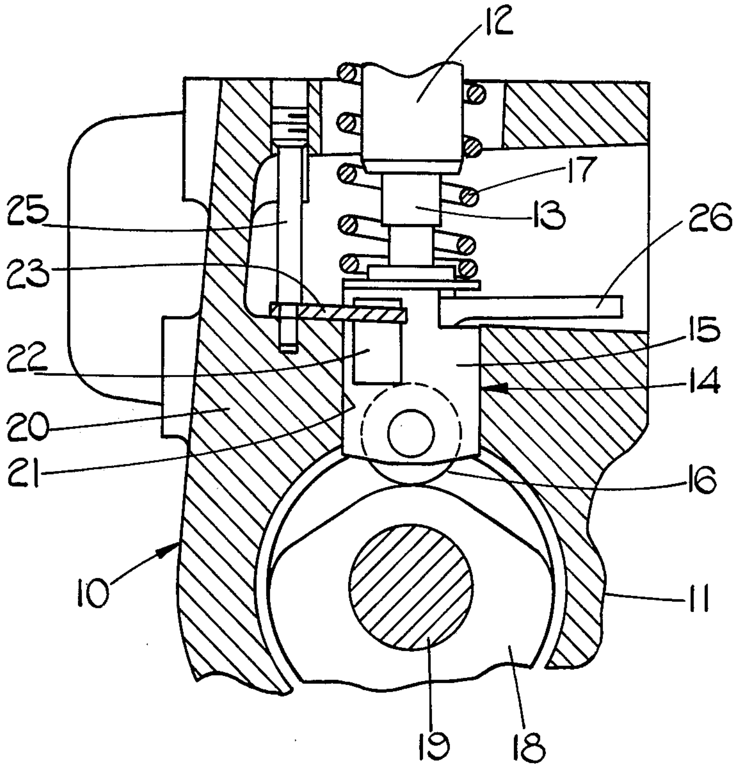

An embodiment of the present invention will now be described, by way of example, with reference to the accompanying drawing, in which:

FIG. 1 is a plan view of part of a pumping apparatus according to the present invention; and FIG. 2 is a sectional side view of the pumping apparatus of FIG. 1, with parts thereof broken away.

Referring to the drawings, the pumping apparatus illustrated therein is in the form of a six-cylinder in-line fuel pump for a compression ignition engine. The fuel pump comprises a housing 10 including a body portion 11 and a plurality of cylinders or barrels 12 (only one shown) mounted thereon. A piston or plunger 13 is reciprocable within each cylinder 12 so as to deliver fuel to a respective outlet (not shown). To the lower end of each piston 13 is connected a tappet assembly 14, which includes a tappet body 15 and a tappet roller 16 rotatably mounted thereon. The roller 16 is biassed by a spring 17 into engagement with a respective cam 18 carried by a rotatable shaft 19 which is journalled on the body portion 11. Rotation of the shaft 19 causes reciprocation of the tappet assemblies 14 together with their respective pistons 13.

A block 20 forms an integral part of the body portion 11, and has a plurality of bores 21 formed therethrough, a respective one of the tappet assemblies 14 being reciprocable within each bore 21. Each bore 21 is of circular cylindrical form, as is the external surface of the tappet body 15 which engages therewith. A pair of flats 22 are machined on each tappet body 15, such that the flats 22 on each pair of adjacent tappet bodies 15 face each other and are mutually inclined, as can be appreciated from FIG. 1.

A guide plate 23 is mounted on the upper surface of the block 20, i.e. on a side thereof remote from the cams 18 and shaft 19, and extends along the line of pistons 13. The guide plate 23 includes as integral parts thereof three guide members 24. Each guide member 24 extends between a respective pair of adjacent tappet bodies 15, and is wedge-shaped so as to engage one of the flats 22 on each said body 15 and thereby prevent rotation of the tappet bodies 15 relative to the block 20.

Reference numeral 25 denotes elongate, screw-threaded pins by which the guide plate 23 is secured to the upper surface of the block 20. Reference numeral 26 denotes arms operatively connected to the pistons 13 respectively, by means of which angular movement of the pistons 13 within their respective cylinders 12 can be effected to alter the quantity of fuel delivered to the respective outlets at each piston stroke.

In the above-described fuel pump, the guide plate 23 provides a convenient manner of preventing rotation of the tappet assemblies 14 relative to the housing 10. Conventionally, such rotation is normally prevented by machining the flats 22 so that, on adjacent tappet bodies 15, they face each other and are mutually parallel, and by locating a tee-piece between each adjacent pair of tappet bodies 15. This necessitates the block 20 being machined away between the bores 21 to accommodate the tee-pieces, which results in a weakening of the block 20. Also, the interposition of the tee-pieces between the tappet bodies 15 sets a limit on the minimum possible distance between adjacent bores 21.

In the fuel pump described above, no machining away of the block 20 between the bores 21 is necessary, resulting in the block 20 being comparatively strong. Also, the arrangement of the mutually inclined flats 22 and the wedge-shaped guide members 24 enables the bores 21 to be placed closer together, thereby reducing the overall length of the fuel pump.

I claim:

1. A fuel pumping apparatus comprising a housing including a plurality of cylinders; a piston reciprocable within each cylinder; a tappet assembly operatively connected to each piston and including a tappet body and a tappet roller rotatably carried thereby, each tappet body having a guide surface thereon, the guide surfaces on each adjacent pair of tappet bodies being mutually facing; a plurality of rotatable cams each engaged by a respective one of the tappet rollers, such that rotation of each cam in use causes reciprocation of the respective tappet assembly and the respective piston; the housing also including a block having a plurality of bores therethrough, each bore slidably housing a respective one of the tappet assemblies; and the apparatus further comprising a guide assembly mounted on a side of said block remote from the rotatable cams, the guide assembly including wedge shaped guide members each of which extends between a respective adjacent pair of tappet bodies and engages mutually inclined guide surfaces thereon so as to prevent rotation of the tappet assemblies relative to the block.

2. An apparatus according to claim 1 in which each tappet body is of generally circular cylindrical external shape and the guide surface thereon is in the form of a flat.

3. An apparatus according to claim 2 in which the guide assembly is in the form of a plate, said guide members being integral with the plate.

4. A fuel pumping apparatus comprising a housing including a plurality of cylinders, a piston reciprocable within each cylinder; a tappet assembly operatively connected to each piston and including a tappet body and a tappet roller rotatably carried thereby, each tappet body having a guide surface thereon, the guide surfaces on each adjacent pair of tappet bodies being mutually facing and mutually inclined; a plurality of rotatable cams each engaged by a respective one of the tappet rollers, such that rotation of each cam in use causes reciprocation of the respective tappet assembly and the respective piston; and a guide assembly mounted on the housing and including a plurality of wedge-shaped guide members, each guide member extending between a respective adjacent pair of tappet bodies and engaging the guide surfaces thereon so as to prevent rotation of the tappet assemblies relative to the housing.

* * * * *